US012115394B2

(12) United States Patent
Peake

(10) Patent No.: US 12,115,394 B2
(45) Date of Patent: Oct. 15, 2024

(54) OBOGS COMPOSITION CONTROL AND HEALTH MONITORING

(71) Applicant: Cobham Mission Systems Davenport LSS Inc., Davenport, IA (US)

(72) Inventor: Steven C. Peake, Dubuque, IA (US)

(73) Assignee: Cobham Mission Systems Davenport LSS Inc., Davenport, IA (US)

( * ) Notice: Subject to any disclaimer, the term of this patent is extended or adjusted under 35 U.S.C. 154(b) by 905 days.

(21) Appl. No.: 17/178,977

(22) Filed: Feb. 18, 2021

(65) Prior Publication Data
US 2021/0252317 A1 Aug. 19, 2021

Related U.S. Application Data

(60) Provisional application No. 62/978,097, filed on Feb. 18, 2020.

(51) Int. Cl.
*A62B 27/00* (2006.01)
*B01D 53/047* (2006.01)

(52) U.S. Cl.
CPC .......... *A62B 27/00* (2013.01); *B01D 53/047* (2013.01); *B01D 2256/12* (2013.01); *B01D 2259/4575* (2013.01)

(58) Field of Classification Search
CPC ........ A62B 27/00; A62B 7/14; B01D 53/047; B01D 2256/12; B01D 2259/4575; B01D 2259/40007; A62C 37/50
See application file for complete search history.

(56) References Cited

U.S. PATENT DOCUMENTS

| 4,222,750 | A | 9/1980 | Gauthier et al. |
| 4,335,735 | A | 6/1982 | Cramer et al. |
| 5,858,063 | A | 1/1999 | Cao et al. |
| 2004/0187613 | A1 | 9/2004 | Peacey et al. |
| 2014/0137741 | A1 | 5/2014 | Taylor et al. |
| 2019/0175856 | A1* | 6/2019 | Galbraith .......... A61M 16/0066 |

FOREIGN PATENT DOCUMENTS

| EP | 2143636 | 1/2010 |
| JP | 59141958 | 8/1984 |
| JP | 11000410 | 1/1999 |
| WO | 2018/191385 | 10/2018 |
| WO | WO-2021056065 A1 * | 4/2021 ......... A61M 16/024 |

* cited by examiner

*Primary Examiner* — Joseph J Dallo
(74) *Attorney, Agent, or Firm* — Woods Oviatt Gilman LLP; Katherine H. McGuire, Esq.

(57) ABSTRACT

A method of monitoring health of an oxygen concentrator assembly within an onboard oxygen generating system (OBOGS) operable to produce an oxygen enriched gas is provided. The OBOGS includes a controller, a plurality of molecular sieve beds for producing the oxygen enriched gas, and a mechanical system for selectively communicating an inlet air to a subset of the plurality of molecular sieve at a given time. The method includes monitoring the health of the overall OBOGS and the mechanical system to determine whether one or more of the molecular sieve beds and/or the oxygen concentrator assembly need to be serviced.

8 Claims, 17 Drawing Sheets

Table A-1, Run 1

| Run 1 | Breathing Machine 1 # of Breaths | lpm | bpm | Time (min) | Breathing Machine 2 # of Breaths | lpm | bpm | Time (min) | Leak (lpm) | Inlet Pressure (psig) | Inlet Pressure Compensated for Aircraft Altitude (psig) | Aircraft Altitude (kFt) | Cabin Altitude (kFt) |
|---|---|---|---|---|---|---|---|---|---|---|---|---|---|
| A | 40 | 20 | 8 | 5 | 50 | 20 | 10 | 5 | 0 | 10 | 10 | 0 | 0 |
| B | 100 | 80 | 20 | 5 | 110 | 80 | 22 | 5 | 0 | 30 | 32 | 20 | 8 |
| C | 75 | 40 | 30 | 5 | 80 | 40 | 32 | 5 | 0 | 40 | 32 | 20 | 8 |
| D | 15 | 150 | 30 | 1 | 16 | 150 | 32 | 1 | 0 | 60 | 55 | 10 | 5 |
| E | 20 | 40 | 20 | 4 | 22 | 40 | 22 | 4 | 0 | 50 | 40 | 25 | 8 |
| F | 1 | 120 | 20 | 1 | 1 | 120 | 20 | 1 | 0 | 50 | 40 | 25 | 8 |
| G | 20 | 40 | 20 | 4 | 22 | 40 | 22 | 4 | 0 | 50 | 40 | 25 | 8 |
| H | 1 | 120 | 20 | 1 | 1 | 120 | 20 | 1 | 0 | 50 | 40 | 25 | 8 |
| I | 20 | 40 | 20 | 4 | 22 | 40 | 22 | 4 | 0 | 50 | 40 | 25 | 8 |
| J | 1 | 120 | 20 | 1 | 1 | 120 | 20 | 1 | 0 | 50 | 40 | 25 | 8 |
| K | 20 | 40 | 20 | 4 | 22 | 40 | 22 | 4 | 0 | 50 | 40 | 25 | 8 |
| L | 1 | 120 | 20 | 1 | 1 | 120 | 20 | 1 | 0 | 50 | 40 | 25 | 8 |
| M | 125 | 120 | 25 | 10 | 135 | 120 | 27 | 10 | 0 | 20 | 20 | Ramp to Gnd | Ramp to Gnd |

FIG. 5

Table A-II, Run 2

| Run 2 | Breathing Machine 1 # of Breaths | lpm | bpm | Time (min) | Breathing Machine 2 # of Breaths | lpm | bpm | Time (min) | Leak (lpm) | Inlet Pressure (psig) | Inlet Pressure Compensated for Aircraft Altitude (psig) | Aircraft Altitude (KFt) | Cabin Altitude (KFt) |
|---|---|---|---|---|---|---|---|---|---|---|---|---|---|
| A | 40 | 20 | 8 | 5 | 50 | 20 | 10 | 5 | 7 | 10 | 10 | 0 | 0 |
| B | 100 | 80 | 20 | 5 | 100 | 80 | 22 | 5 | 7 | 80 | 82 | 20 | 8 |
| C | 75 | 40 | 30 | 5 | 80 | 40 | 30 | 5 | 7 | 40 | 32 | 20 | 8 |
| D | 15 | 150 | 30 | 1 | 10 | 150 | 30 | 1 | 7 | 80 | 55 | 10 | 5 |
| E | 20 | 40 | 20 | 4 | 22 | 40 | 22 | 4 | 7 | 50 | 40 | 25 | 8 |
| F | 1 | 120 | 20 | 1 | 1 | 120 | 20 | 1 | 7 | 50 | 40 | 25 | 8 |
| G | 20 | 40 | 20 | 4 | 22 | 40 | 20 | 4 | 7 | 50 | 40 | 25 | 8 |
| H | 1 | 120 | 20 | 1 | 1 | 120 | 20 | 1 | 7 | 50 | 40 | 25 | 8 |
| I | 20 | 40 | 20 | 4 | 22 | 40 | 22 | 4 | 7 | 50 | 40 | 25 | 8 |
| J | 1 | 120 | 20 | 1 | 1 | 120 | 20 | 1 | 7 | 50 | 40 | 25 | 8 |
| K | 20 | 40 | 20 | 4 | 22 | 40 | 22 | 4 | 7 | 50 | 40 | 25 | 8 |
| L | 1 | 120 | 20 | 1 | 1 | 120 | 20 | 1 | 7 | 50 | 40 | 25 | 8 |
| M | 125 | 120 | 25 | 10 | 135 | 120 | 27 | 10 | 7 | 20 | 20 | Ramp to Gnd | Ramp to Gnd |

FIG. 6

Table A-III, Run 3

| Run 3 | Breathing Machine 1 # of Breaths | lpm | bpm | Time (min) | Breathing Machine 2 # of Breaths | lpm | bpm | Time (min) | Leak (lpm) | Inlet Pressure (psig) | Inlet Pressure Compensated for Aircraft Altitude (psig) | Aircraft Altitude (kFt) | Cabin Altitude (kFt) |
|---|---|---|---|---|---|---|---|---|---|---|---|---|---|
| A | 40 | 40 | 8 | 5 | 50 | 40 | 10 | 5 | 14 | 10 | 10 | 0 | 0 |
| B | 100 | 140 | 20 | 5 | 110 | 140 | 22 | 5 | 14 | 60 | 82 | 20 | 8 |
| C | 75 | 80 | 30 | 5 | 80 | 80 | 32 | 5 | 14 | 40 | 32 | 20 | 8 |
| D | 20 | 270 | 40 | 1 | 21 | 270 | 42 | 1 | 14 | 80 | 65 | 10 | 5 |
| E | 20 | 80 | 20 | 4 | 22 | 80 | 22 | 4 | 14 | 60 | 40 | 25 | 8 |
| F | 1 | 120 | 20 | 1 | 1 | 120 | 20 | 1 | 14 | 50 | 40 | 25 | 8 |
| G | 20 | 80 | 20 | 4 | 22 | 80 | 22 | 4 | 14 | 50 | 40 | 25 | 8 |
| H | 1 | 120 | 20 | 1 | 1 | 120 | 20 | 1 | 14 | 50 | 40 | 25 | 8 |
| I | 20 | 80 | 20 | 4 | 22 | 80 | 22 | 4 | 14 | 50 | 40 | 25 | 8 |
| J | 1 | 120 | 20 | 1 | 1 | 120 | 20 | 1 | 14 | 50 | 40 | 25 | 8 |
| K | 20 | 80 | 20 | 4 | 22 | 80 | 22 | 4 | 14 | 50 | 40 | 25 | 8 |
| L | 1 | 120 | 20 | 1 | 1 | 120 | 20 | 1 | 14 | 50 | 40 | 25 | 8 |
| M | 175 | 240 | 35 | 10 | 185 | 240 | 37 | 10 | 14 | 20 | 20 | Ramp to Gnd | Ramp to Gnd |

FIG. 7

Table A-IV, Run 4

| Run 4 | Breathing Machine 1 # of Breaths | lpm | bpm | Time (min) | Breathing Machine 2 # of Breaths | lpm | bpm | Time (min) | Leak (lpm) | Inlet Pressure (psig) | Inlet Pressure Compensated for Aircraft Altitude (psig) | Aircraft Altitude (kFt) | Cabin Altitude (kFt) |
|---|---|---|---|---|---|---|---|---|---|---|---|---|---|
| A | 40 | 50 | 8 | 5 | 50 | 50 | 10 | 5 | 28 | 10 | 10 | 0 | 0 |
| B | 65 | 180 | 25 | 5 | 70 | 180 | 28 | 5 | 28 | 80 | 80 | 20 | 8 |
| C | 75 | 120 | 30 | 5 | 80 | 120 | 32 | 5 | 28 | 40 | 32 | 20 | 8 |
| D | 22 | 320 | 44 | 1 | 23 | 320 | 40 | 1 | 28 | 80 | 58 | 10 | 5 |
| E | 20 | 80 | 20 | 4 | 22 | 80 | 22 | 4 | 28 | 50 | 40 | 25 | 8 |
| F | 1 | 120 | 20 | 1 | 1 | 120 | 20 | 1 | 28 | 50 | 40 | 25 | 8 |
| G | 20 | 80 | 20 | 4 | 22 | 80 | 22 | 4 | 28 | 50 | 40 | 25 | 8 |
| H | 1 | 120 | 20 | 1 | 1 | 120 | 20 | 1 | 28 | 50 | 40 | 25 | 8 |
| I | 20 | 80 | 20 | 4 | 22 | 80 | 22 | 4 | 28 | 50 | 40 | 25 | 8 |
| J | 1 | 120 | 20 | 1 | 1 | 120 | 20 | 1 | 28 | 50 | 40 | 25 | 8 |
| K | 20 | 80 | 20 | 4 | 22 | 80 | 22 | 4 | 28 | 50 | 40 | 25 | 8 |
| L | 1 | 120 | 20 | 1 | 1 | 120 | 20 | 1 | 28 | 50 | 40 | 25 | 8 |
| M | 200 | 280 | 40 | 10 | 135 | 280 | 42 | 10 | 28 | 20 | 20 | Ramp to Gnd | Ramp to Gnd |

FIG. 8

Table A-V, Run 5

| Run 5 | Breathing Machine 1 | | | Time (min) | Breathing Machine 2 | | | Time (min) | Leak (lpm) | Inlet Pressure (psig) | Inlet Pressure Compensated for Aircraft Altitude (psig) | Aircraft Altitude (KFt) | Cabin Altitude (KFt) |
|---|---|---|---|---|---|---|---|---|---|---|---|---|---|
| | # of Breaths | lpm | bpm | | # of Breaths | lpm | bpm | | | | | | |
| A | 40 | 20 | 8 | 5 | 50 | 20 | 10 | 5 | 42 | 10 | 10 | 0 | 0 |
| B | 100 | 80 | 20 | 5 | 100 | 80 | 20 | 5 | 42 | 80 | 80 | 20 | 8 |
| C | 75 | 40 | 30 | 5 | 80 | 40 | 32 | 5 | 42 | 40 | 32 | 20 | 8 |
| D | 15 | 150 | 30 | 1 | 10 | 150 | 32 | 1 | 42 | 60 | 55 | 10 | 5 |
| E | 20 | 40 | 20 | 4 | 22 | 40 | 22 | 4 | 42 | 50 | 40 | 25 | 8 |
| F | 1 | 120 | 20 | 1 | 1 | 120 | 20 | 1 | 42 | 50 | 40 | 25 | 8 |
| G | 20 | 40 | 20 | 4 | 22 | 40 | 22 | 4 | 42 | 50 | 40 | 25 | 8 |
| H | 1 | 120 | 20 | 1 | 1 | 120 | 22 | 1 | 42 | 50 | 40 | 25 | 8 |
| I | 20 | 40 | 20 | 4 | 22 | 40 | 22 | 4 | 42 | 50 | 40 | 25 | 8 |
| J | 1 | 120 | 20 | 1 | 1 | 120 | 22 | 1 | 42 | 50 | 40 | 25 | 8 |
| K | 20 | 40 | 20 | 4 | 22 | 40 | 22 | 4 | 42 | 50 | 40 | 25 | 8 |
| L | 1 | 120 | 20 | 1 | 1 | 120 | 22 | 1 | 42 | 50 | 40 | 25 | 8 |
| M | 135 | 120 | 25 | 10 | 135 | 120 | 27 | 10 | 42 | 20 | 20 | Ramp to Grnd | Ramp to Grnd |

FIG. 9

OBOGS COMPOSITION CONTROL AND HEALTH MONITORING

FIELD OF THE INVENTION

The present invention relates to an onboard oxygen generating system (OBOGS) of an aircraft, and more particularly to an improved apparatus, system and method for continuous health monitoring of an OBOGS, and still more particularly to an improved apparatus, system and method for continuous health monitoring of an OBOGS that determines both sieve bed health and valve/seal performance.

BACKGROUND OF THE INVENTION

Previously, a Maintenance Built-In Test (MBIT) function was initiated to periodically test OBOGS bed health. The intent of the MBIT function is to anticipate the need for sieve bed replacement before low oxygen ($O_2$) warnings occur in flight. The MBIT function is limited to only interrogate sieve bed health and does not determine valve and/or seal health.

Thus, there is a need for a method to monitor OBOGS system/bed performance and identify whether the failure is due to bed degradation or to a mechanical or electrical issue. With the availability of field replaceable sieve beds, monitoring for both bed degradation and mechanical or electrical issues is of even greater importance in order to select the appropriate maintenance activity.

Current MBIT functions estimate bed health by loading the Oxygen Concentrator Assembly (OCA) with a known flow of source gas during an aircraft-selected MBIT function. This test requires either a ground cart supply or turning the engines to provide a known inlet air pressure supply to the OCA. As the beds degrade over time, the oxygen concentration produced at this fixed flow will continue to decrease, acting as a rough indicator of bed health.

SUMMARY OF THE INVENTION

Bed health is a large factor in OCA performance. Thus, increasing the accuracy in its monitoring is critical to improving OCA reliability and maintainability. There are several advantages to utilizing an embodiment of a concentrator health monitor (CHM) in accordance with the present invention when compared to conventional MBIT functions. First, CHM runs continuously in the background of aircraft operations and does not require an MBIT function. This decreases maintenance efforts by removing the need for a ground cart supply or turning of the engines during maintenance. Second, CHM is implemented in the software of the OCA and requires no additional hardware. This allows for the removal of the MBIT valves which effectively decreases the overall weight of the OCA. Third, CHM offers greater accuracy than MBIT as it accounts for variables other than flow. Fourth, CHM also includes slide valve health monitoring which helps to identify and isolate OCA issues during maintenance.

BRIEF DESCRIPTION OF THE DRAWINGS

FIG. 5 is a table showing results from Run 1 of 5 of a Leak Load Test, with a system leak of 0 liters per minute (lpm);

FIG. 6 is a table showing results from Run 2 of 5 of the Leak Load Test, with a system leak of 7 lpm;

FIG. 7 is a table showing results from Run 3 of 5 of the Leak Load Test, with a system leak of 14 lpm;

FIG. 8 is a table showing results from Run 4 of 5 of the Leak Load Test, with a system leak of 28 lpm;

FIG. 9 is a table showing results from Run 5 of 5 of the Leak Load Test, with a system leak of 42 lpm;

DETAILED DESCRIPTION OF PREFERRED EMBODIMENTS

Figure 1:
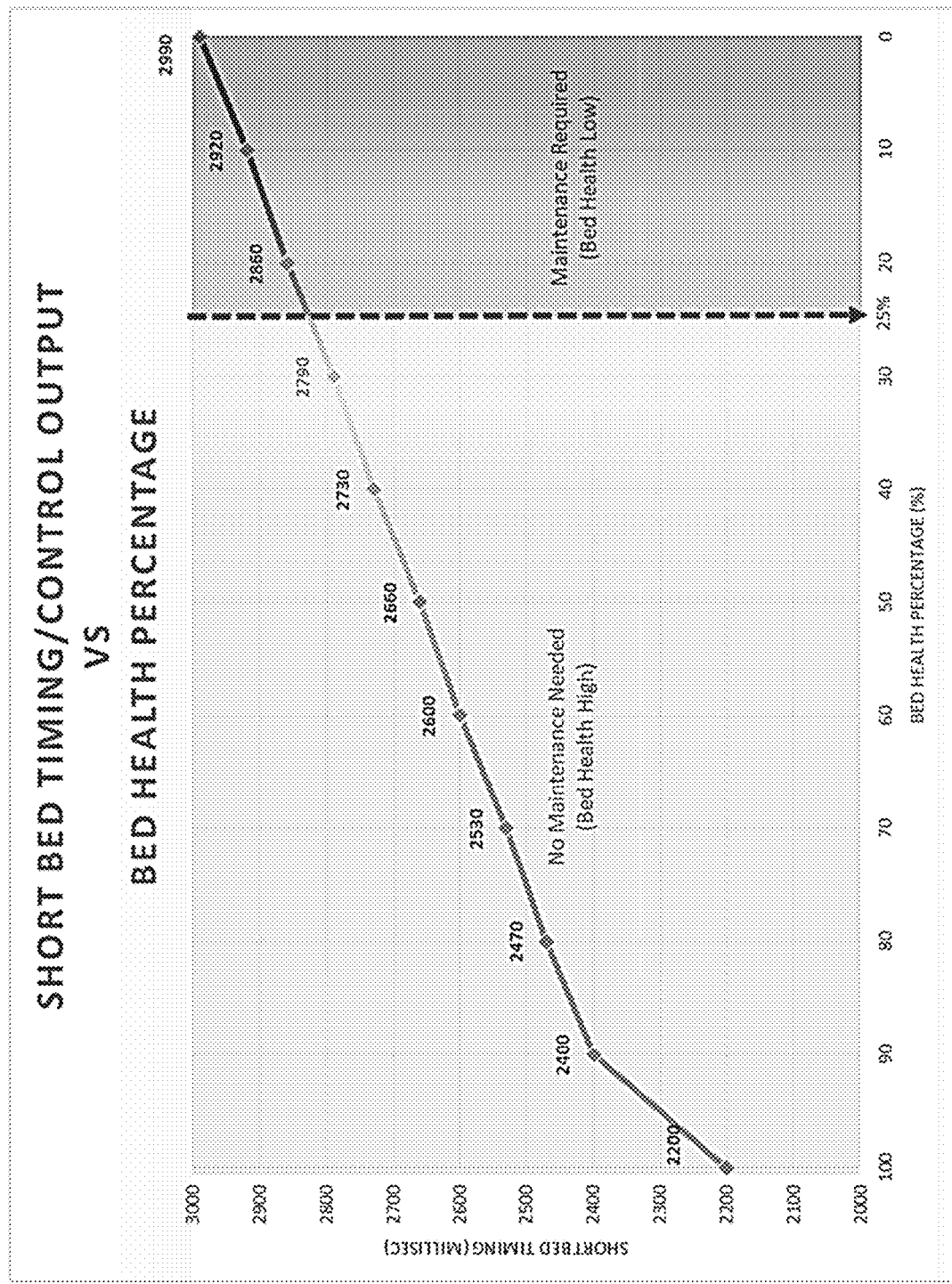
FIG. 1 is a graph showing sort bed timing/control output vs bed heath percentage.

In accordance with an aspect of the present invention, a composition control algorithm has introduced a new possibility for oxygen concentrator health monitoring by continuously calculating a control output value. This output value is used in the feedback control to maintain a target oxygen ($O_2$) concentration. In one embodiment, the output value may be calculated at or about every 6 seconds and may be expressed as a value between about 2,200 and 3,000. This value represents the cycle timing of the shorter of the two sieve beds (discussed below) and is computed in milliseconds.

Currently, Applicant's SureSTREAM™ oxygen concentrator unit operates on a 6-second full cycle and varies the balance between half cycles to control the oxygen output. A slide valve is utilized to allow air to pass to and from the sieve beds in accordance with the control output. It should be noted that, while the below discussion describes the mechanical system as including a slide valve and associated seals, other mechanical systems are known and used in the art to facilitate bed switching, such as but not limited to solenoid or rotary valves. The exemplary methods described herein may be adapted to such other mechanical systems, with such adaptations considered as being within the teachings of the present invention.

For each short bed cycle time (in seconds), there will be a corresponding long bed cycle time. The value of the long bed cycle (in seconds) can be calculated by subtracting the short bed cycle time (e.g., 2.2 seconds) from the full cycle time (i.e., 6 seconds). In this example, the long cycle time would be 3.8 seconds. These values may change in different embodiments. For instance, the full cycle time may be different depending upon system requirements.

It has been found that there is a positive correlation between the length of time of the short bed cycle and the amount of $O_2$ concentrated by that bed. For instance, an output value of 2,200 (cycle length of 2.2 seconds) concentrates the least amount of $O_2$ while an output value of 3,000 (cycle length of 3 seconds) concentrates the greatest. Note that when revised composition control is implemented, the greatest value is equal to the maximum compensation control value, which is one half of the full cycle value. In the example having a full cycle length of 6 seconds, the maximum compensation control value is 3,000 (i.e., 3 second cycle time for both the long and short bed cycles).

As oxygen concentrator performance degrades, the controller compensates the length of the short bed cycle in order to reach the target $O_2$ level as per an oxygen schedule via a feedback control operation. In one aspect of the present invention, slide valve timing is adjusted so as to deliver the target $O_2$ production. Thus, as beds degrade the control output value gets larger to accomplish the amount of same work (i.e., increases from 2,200 toward 3,000 to produce the same amount of oxygen).

By monitoring the feedback control of the slide valve timing, the degradation of concentrator performance over time may be determined. A symmetrical cycle of 3-3 (3 seconds per bed) maximizes the amount of $O_2$ generated (for an exemplary 6 second full cycle unit). As the cycle timing approaches 3-3 for any fixed target concentration, it can be inferred that the concentrator has degraded in a proportional manner and will require maintenance soon. The control output value will change significantly during any single flight or even between types of flights. For this reason, the control value must be averaged over a significant period of time to prevent nuisance maintenance decisions due to short term conditions with increase demand for oxygen (e.g. a system leak). In accordance with an aspect of the present invention, the control average period may be 20-30 hours. By using a moving average value of the control output from the last 20-30 hours of flight data, the value generated may be used to determine when the concentrator requires maintenance. While the above discussion regarding sieve bed health analyzed slide valve timing as a possible indicator of bed health, it should be noted that other analyses may be used to indicate bed health, such as but not limited to monitoring the flow and purity of the oxygen enriched gas downstream of the molecular sieve beds.

Two key points of implementing the above method include initializing an "average value" at first power up and providing a sufficient resolution to manage a 20-30 hour average value that is updated every 6 seconds. For instance, a new unit with no flight data may be initialized to 2,200 as its "output average" value; this value changes over time as new data is added to the average. When beds are replaced, the old value is "high" and maintenance guidance is provided to ignore this value for the first 30 hours after bed pack replacement. Also, the value is stated as between 20 and 30 hours to allow some flexibility for software implementation of the necessary resolution. In one aspect of the present invention, the 2,200-3,000 millisecond output average may be stored in a Parameter Logging Memory (PLM) column as it is generated. The PLM value will be the same for each group of 6 seconds since PLM is written each second. The output average may also be transmitted on an appropriate data bus as a health indication value that can be read at routine periods by maintenance crew.

A graph of the short bed timing in milliseconds (ms) versus the approximated concentrator health percent is shown in FIG. 1. It is estimated that when the slide valve timing increases to approximately 2800 ms, the concentrator health will be at 25 percent. OCA performance will be significantly degraded at this point and maintenance is highly recommended.

CHM also includes slide valve health monitoring (SVHM). The second most common maintenance issue on the OCA, behind sieve degradation, relates to the deterioration of the slide valve. Monitoring both slide valve and overall concentrator health may allow maintenance personnel to quickly differentiate between a slide valve and a sieve bed degradation, thereby decreasing overall maintenance efforts.

Figure 2:
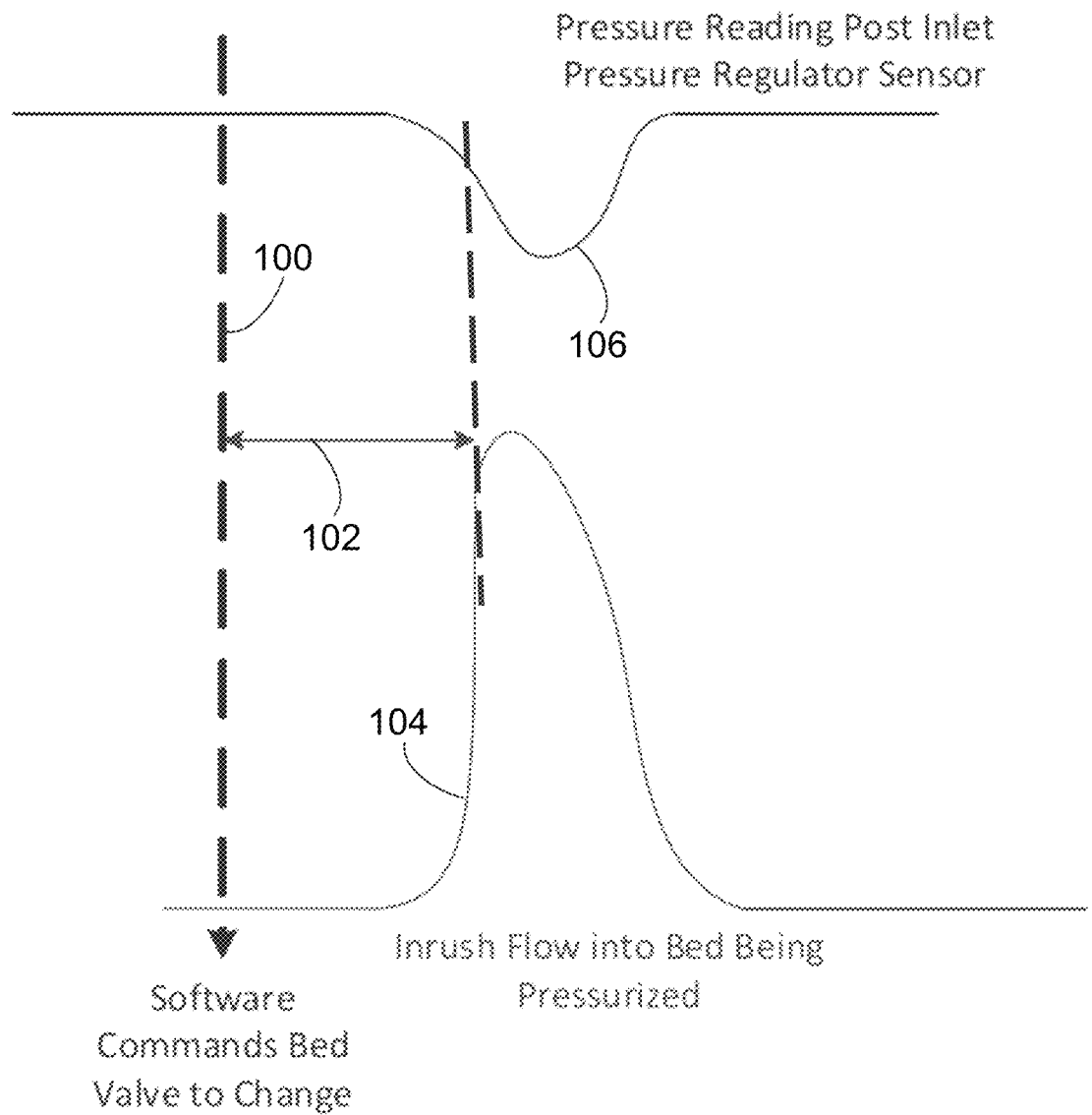
FIG. 2 is a graph showing command signal vs. changes in pressure.
Figure 3:
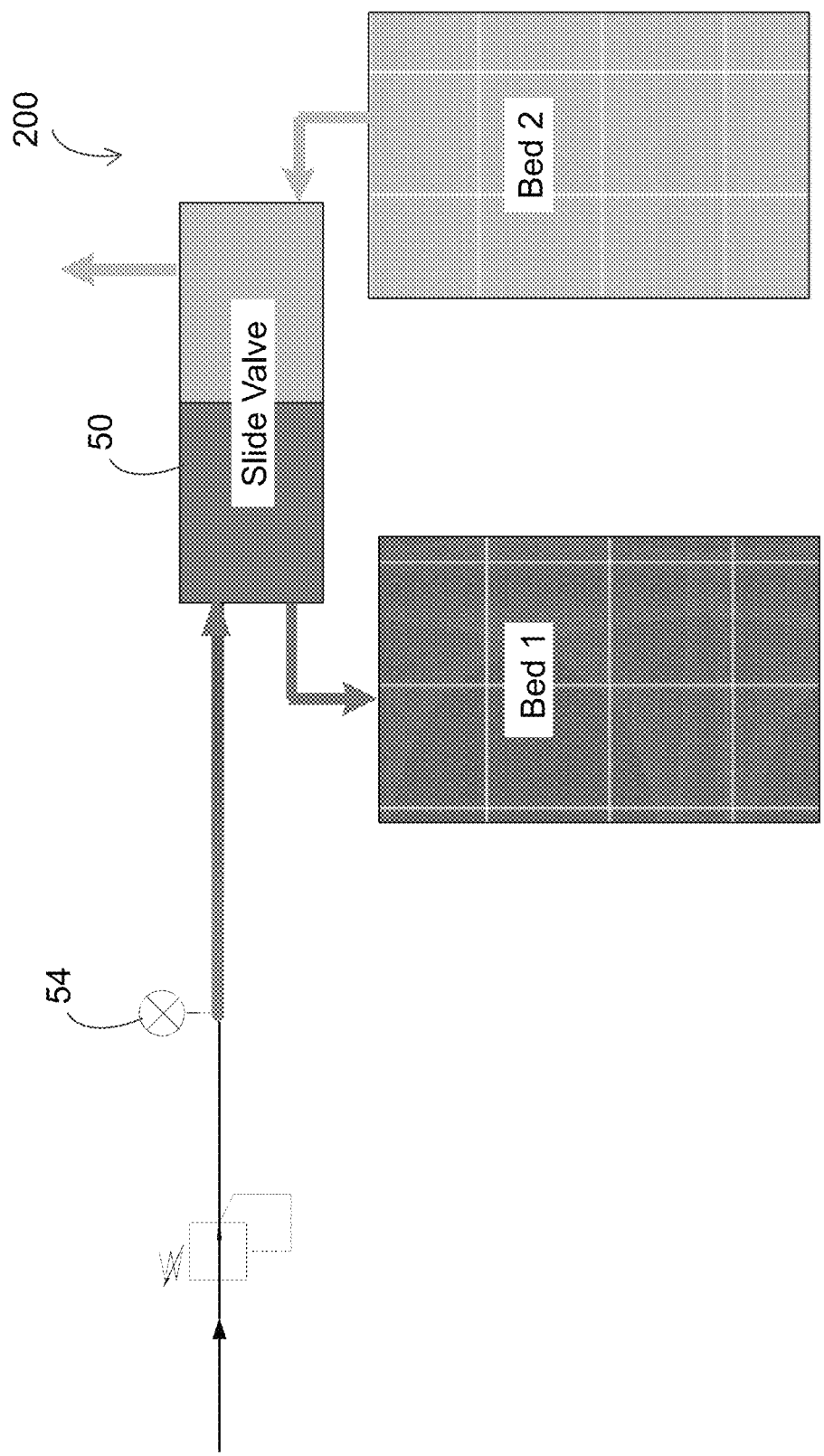
FIG. 3 is a simplified pneumatic schematic of an exemplary concentrator health monitor (CHM) in accordance with an embodiment of the present invention.
Figure 4:
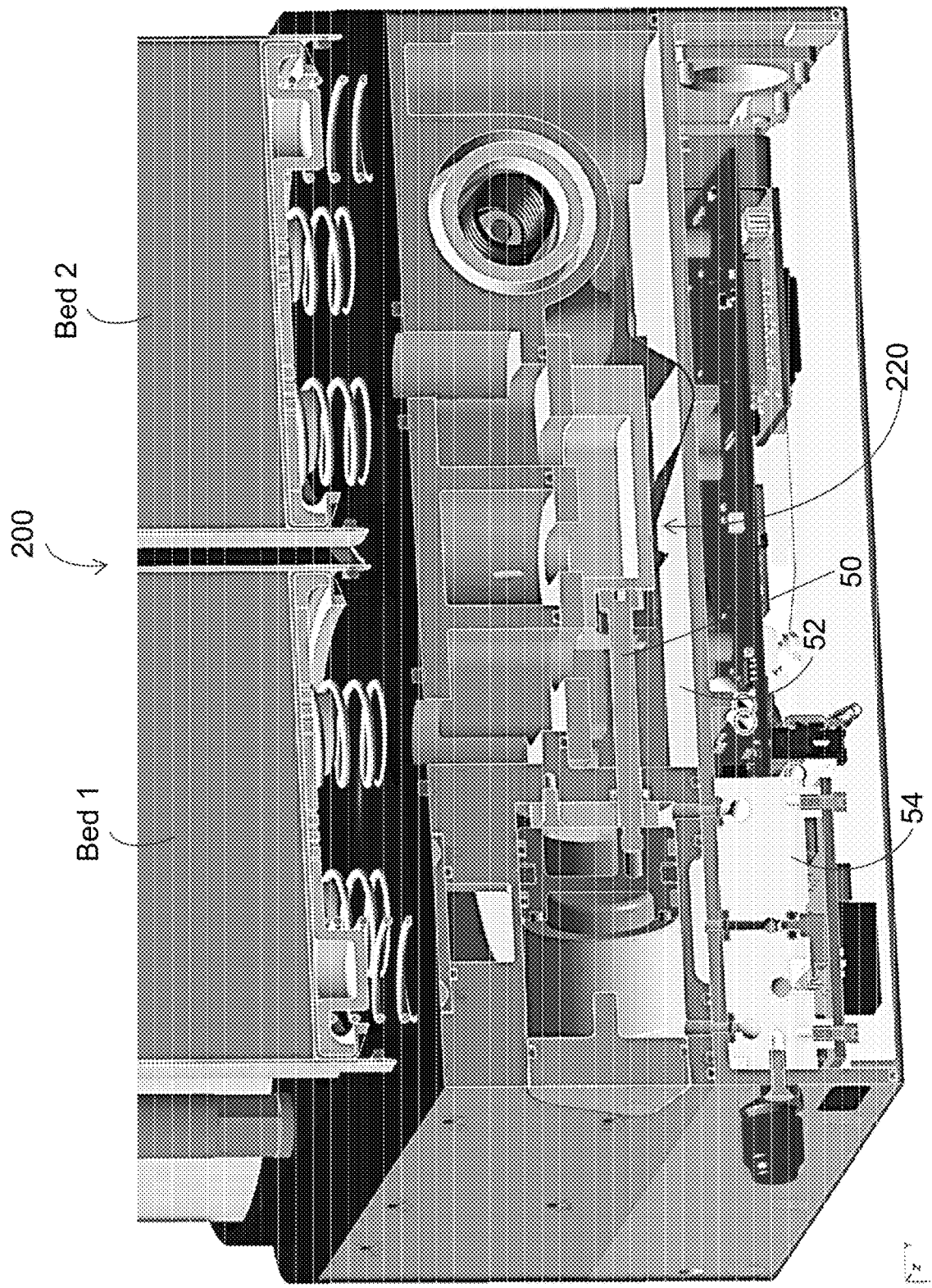
FIG. 4 is a schematic of an oxygen concentrator assembly (OCA) configured for use with an embodiment of a CHM in accordance with an embodiment of the present invention.

SVHM operates by monitoring a "theoretical" command signal and pressure sensor reading. As generally depicted in FIG. 2 and with additional reference to FIGS. 3 and 4, when the command 100 is sent from the controller to the slide valve 50 to change beds (e.g., from bed 1 to bed 2, or vice versa), there is a slight time delay 102 between when the command 100 is sent and when slide valve 50 moves. When slide valve 50 moves, there is a sudden inrush of air 104 into the "active" bed (the bed being switched to, e.g., bed 1). This flow into the "active" bed 1 creates a corresponding dip 106 in pressure in the cavity 52 located after pressure sensor 54 and before the bed 1 and 2 which can be measured. See FIG. 2 through FIG. 4, where the process shown is duplicated when slide valve 50 moves to the other side (e.g., towards bed 2). By measuring the delay 102 between the controller signal command 100 and the dip in pressure 104, slide valve health can be assessed. The larger the time-lag between the command and the pressure dip, the greater the degradation level of the slide valve.

Moving parts in slide valve 50, such as seals, have a significant impact in the performance of the slide valve and are generally the first parts to require maintenance. As the seals wear out, the length of the lag (time delay 102) between the controller command signal 100 and pressure dip 106 increases, signaling the possible need for maintenance. The time delay 102 between command signal 100 and slide valve movement (as measured by pressure dip 106) may also be an indicator of the entire OCA system 200 operation. Slide valve 50 movement is also affected by other additional upstream components, such as pilot valves (not shown). These valves can directly affect OCA 200 efficiency and pneumatic drive system 220 health. Therefore, data on the slide valve 50 time delay 102 can be a strong indicator of maintenance needs.

It has been discovered that there is a significant decrease in OCA performance as seals degrade and there is an imbalance (time delay 102) of greater than 300 ms between movement of the slide valve 50 towards Bed 1 and towards Bed 2. The lag-time (time delay 102) between the software command signal 100 instructing slide valve 50 to move and the resulting dip in pressure 106 after the regulator (pressure sensor 54) can be used to sense the timing or "sluggishness" of the slide valve movement. The required time for the valve to move is directly related to the operational health of the mechanical and electrical control system of OCA 200.

In accordance with an aspect of the present invention, by using existing sensors, hardware and software within OCA 200, the pressure at the outlet of the inlet pressure regulator (pressure sensor 54) may be monitored, such as at 50 ms intervals, and reported to the main software, such as at 100 ms intervals. The slide valve 50 and drive system are monitored by measuring the time between the software command 100 for a bed swap and when the inlet pressure dips 106 by a predetermined amount, such as more than 1.0 psi (6.89 kPa). By recording the valve response time 106 after being commanded, a number representing the relative health of the slide valve as well as the associated drive components may be derived.

Thus, according to an embodiment, when a bed change is commanded by the software, a 100 ms timer is started and the current post pressure regulator valve pressure reading is stored. In the above example, resolution must be at least 0.1 psi. This reading is compared to a value 1.0 psi lower than the stored pressure reading every 100 ms. When the post pressure regulator sensor reading reaches this value (e.g., stored pressure reading minus 1.0 psi) the timer is stopped and the time value is stored. Should the timer reaches 500 ms, it will stop and 500 ms will be the stored time value. Once each second, in the PLM module, the stored time value is averaged with the prior 3600 readings. This averaged time value is then written to the PLM data each second.

In accordance with an aspect of the present invention, as the delay value 106 of the valve response increases over time it indicates that the valve is becoming more sluggish. For health monitoring purposes, a pass/fail criteria may not be required. Rather the continuous delay measurement value data can be reviewed periodically by maintenance personnel to check for negative any changes. By way of example and without limitation thereto, when the averaged time value recorded by the PLM module becomes greater than a preselected threshold, such as 300 ms, then slide valve 50 is in danger of negatively affecting operation of the oxygen generators (OCA 200) and a maintenance caution may be triggered to alert the appropriate personnel. For instance, if an operating concentrator (OCA 200) triggers a warning light during flight, maintenance can review the continuous bed health value and the valve health value to determine whether the beds (bed 1 and bed 2) are degraded and should be replaced, or whether the valve system has degraded and the concentrator should be returned for service. Additionally, it may be desirable to provide a warning if the averaged time value recorded exceeds a predetermined threshold, such as for example, 500 ms, for more than a number of preselected cycles, such as 10 cycles, as this would indicate that slide valve 50 has stopped functioning. It should also be noted that a low 02 warning should be provided by the OBOGS which would give an earlier indication of slide valve malfunction.

Demonstration Test Procedure

Progressive Leak Load Testing

As shown in FIG. 5 through FIG. 9, several flight profiles were created that incorporate various random values for breath per minute (bpm), flow in liters per minute (lpm), pressure in pounds per square inch (psi), and altitude in kilofeet (kft). These were developed from recent flight data from several platforms to represent dynamic conditions and variations that may occur in a real flight.

It is difficult to attain sieve beds with varying levels of degradation. In order to simulate degraded sieve, progressively greater leaks were introduced to the system, and were successively added to the breathing demand for two pilots as per Table I, below.

TABLE I

| Leak Values | |
|---|---|
| Run # | Leak (lpm) |
| 1 | 0 |
| 2 | 7 |
| 3 | 14 |

TABLE I-continued

| Leak Values | |
|---|---|
| Run # | Leak (lpm) |
| 4 | 28 |
| 5 | 42 |

As it is difficult to control and gauge the level of degradation in each sieve bed for testing, an alternate method of introducing a relatively higher set of challenges was used. As sieve material degrades, the material is not able to produce as much $O_2$ as when it was new. By adding a static leak 410 (see FIG. 10) between the OCA and the breathing regulators, the system is affected in a similar way. As $O_2$ escapes the system, the controller is forced to compensate by adjusting slide valve timing to concentrate more $O_2$ in order to achieve the target concentration. As such, the length of the short bed cycle approaches 3 seconds which is reflected in the maximum compensation value of 3,000. By using a controlled and measureable leak, it is possible to produce a model with higher resolution that ties the control output average to level of concentrator health.

Test Procedure

Figure 10:
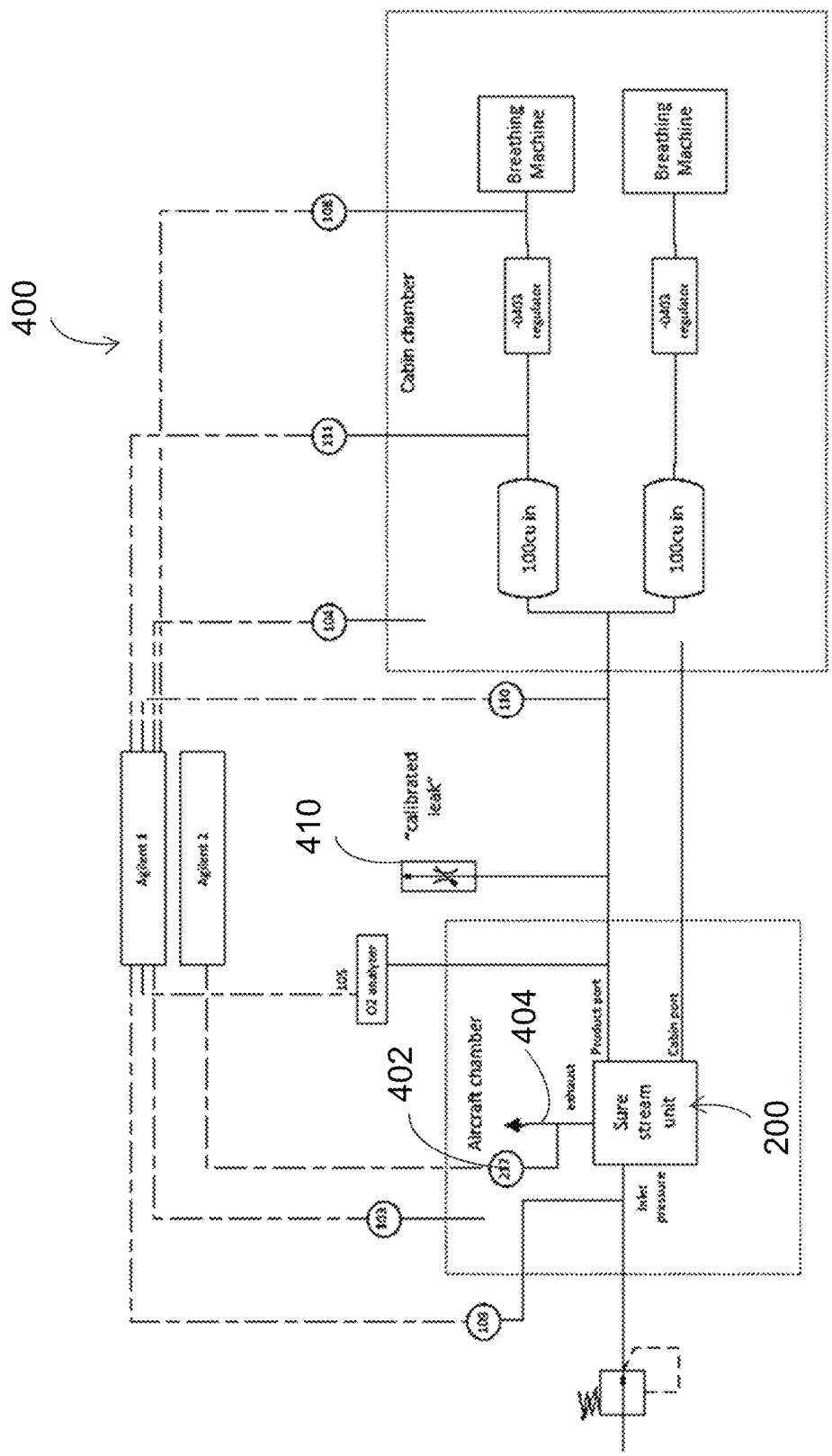
FIG. 10 is a schematic of an OCA configuration used to produce the data presented within FIGS. 5-9.

Applicant's SureSTREAM™ OCA 200 with new sieve beds was tested using configuration 400 shown in FIG. 10 and in accordance with the variables set forth in FIG. 5 through FIG. 9. In order to track the timing of the control output, a pressure transducer 402 was placed in the exhaust port 404, recording at a rate of 20 Hz. When the venting bed exhausts, it creates a flow spike that is logged by the controller. By recording at 20 Hz, the timing of the bed control value (short bed cycle) can be inferred with sufficient time resolution for this test. All other channels on the analyzer were set at 1 Hz. OCA 200 was operated in composition control mode. The exhaust port pressure measured by pressure transducer 402 shows a significant change in value each time the bed changes. These value changes may then be analyzed to produce the duration time of the short bed which is the control output or proposed "output average" number.

Results

Progressive Leak Load Testing Results

Figure 11:
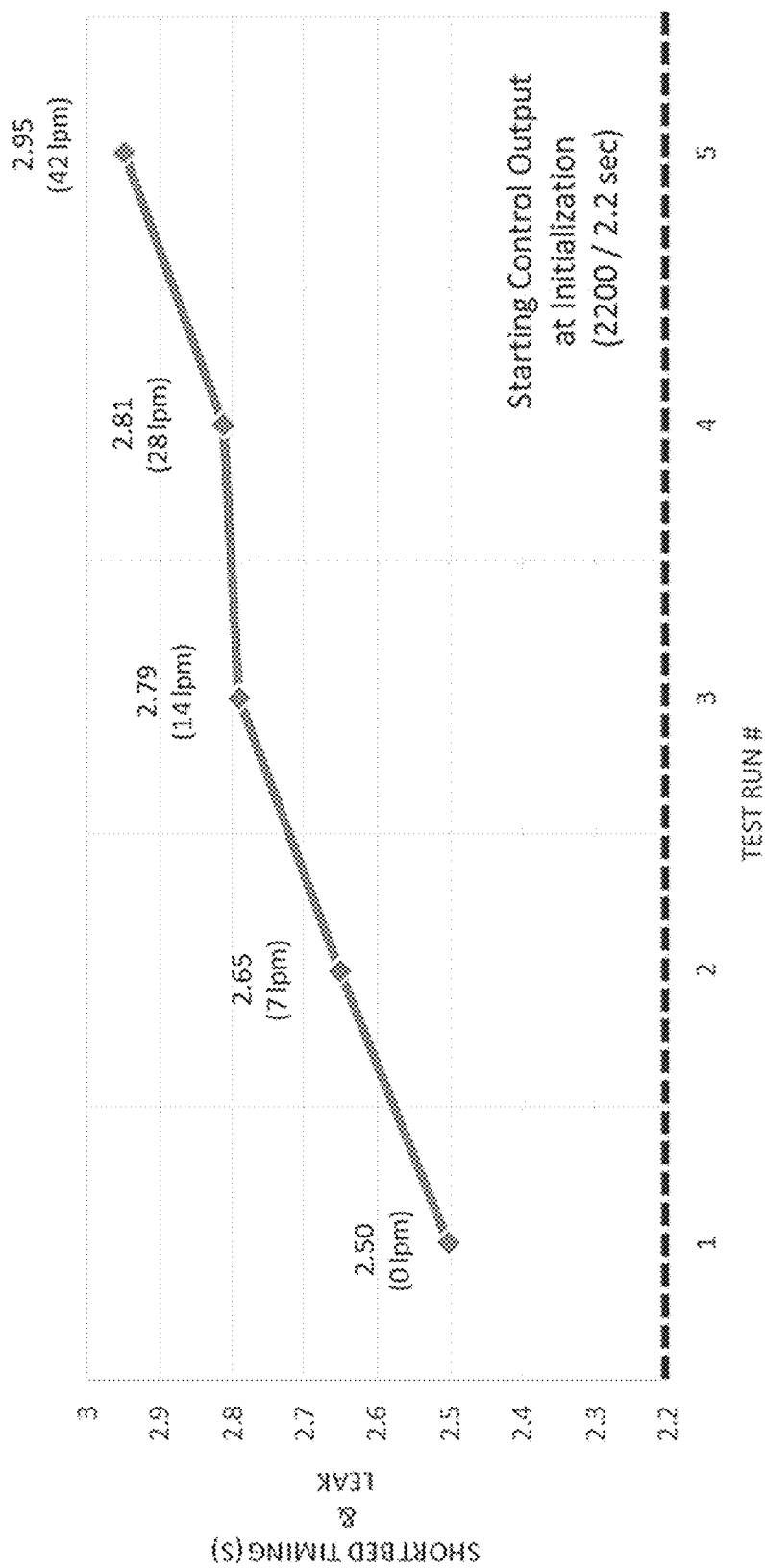
FIG. 11 is a graph showing the short bed cycle time as a function of system leak for Runs 1 through 5 as listed in FIGS. 5-9.

Results expressed in control output average can be seen in FIG. 11. A linear relationship was found between the leak amount and control output average. As expected, the introduced leak forced the control software to compensate by adjusting the slide valve timing to maximize oxygen production. The greater the leak and simulated degradation, the longer the dwell on the first bed and the nearer a balanced bed control output.

Figure 12:
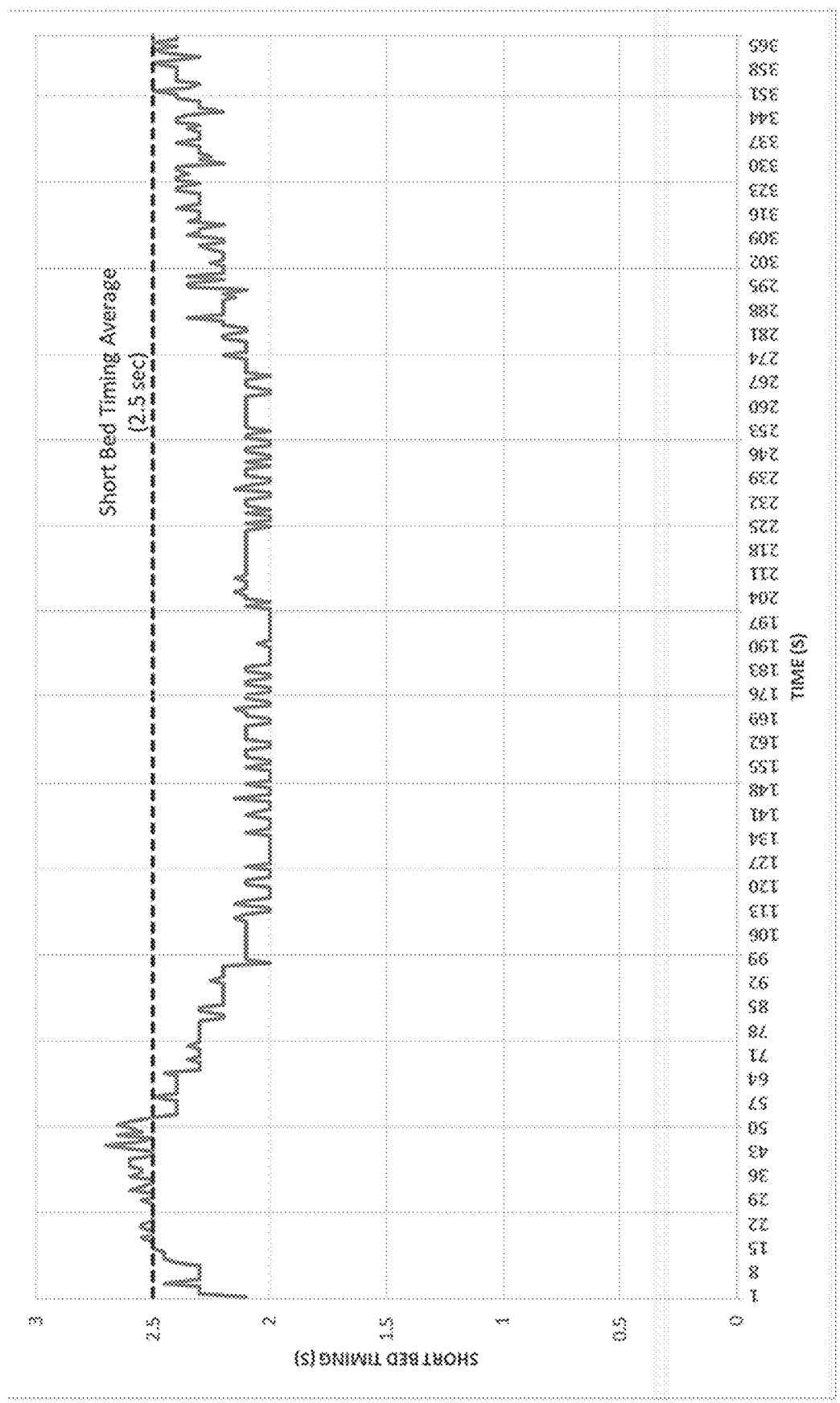
FIG. 12 is a graph showing control output vs time for Run 1 of 5 of the Leak Load Test.
Figure 13:
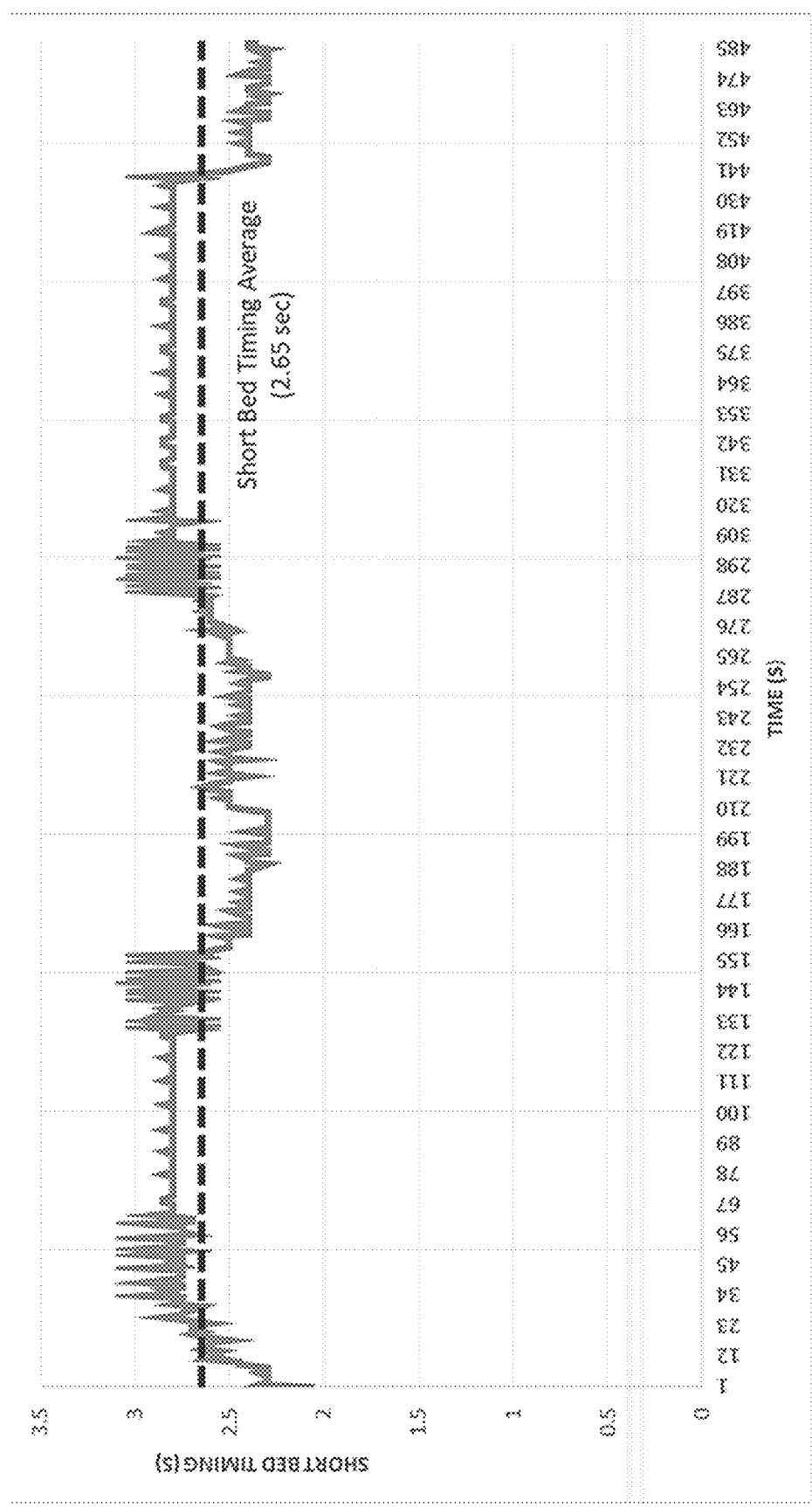
FIG. 13 is a graph showing control output vs time for Run 2 of 5 of the Leak Load Test.
Figure 14:
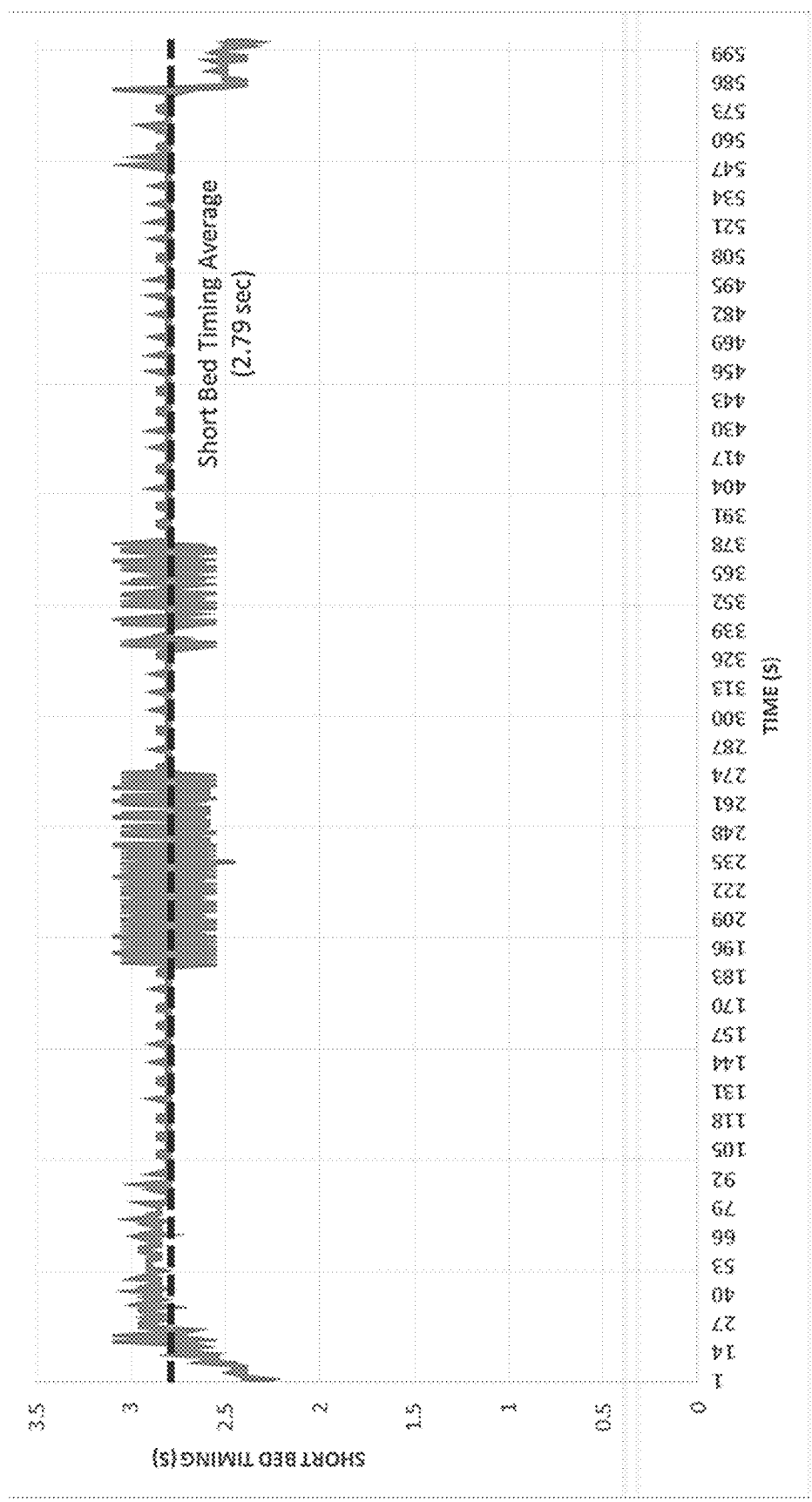
FIG. 14 is a graph showing control output vs time for Run 3 of 5 of the Leak Load Test.
Figure 15:
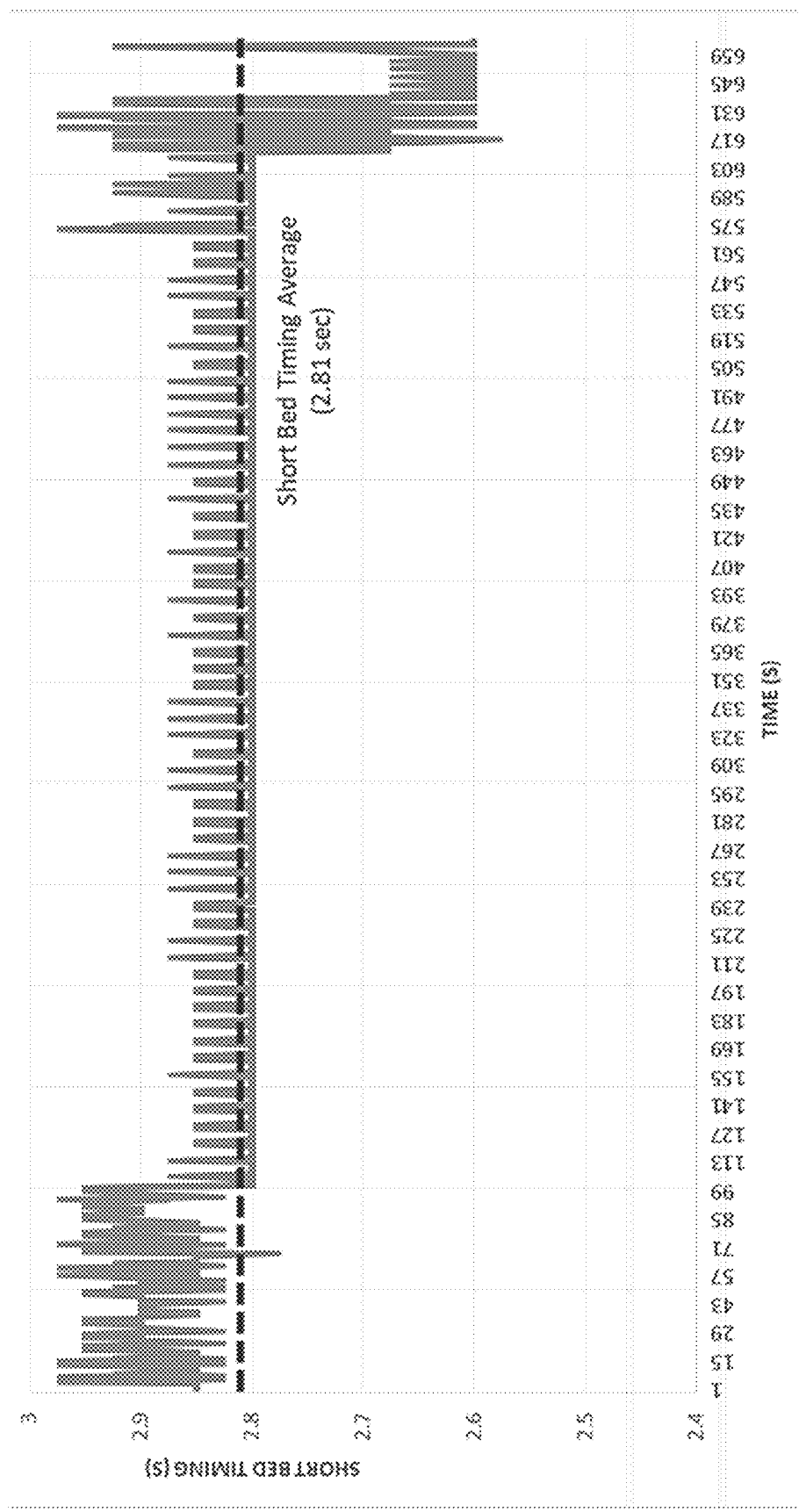
FIG. 15 is a graph showing control output vs time for Run 4 of 5 of the Leak Load Test.
Figure 16:
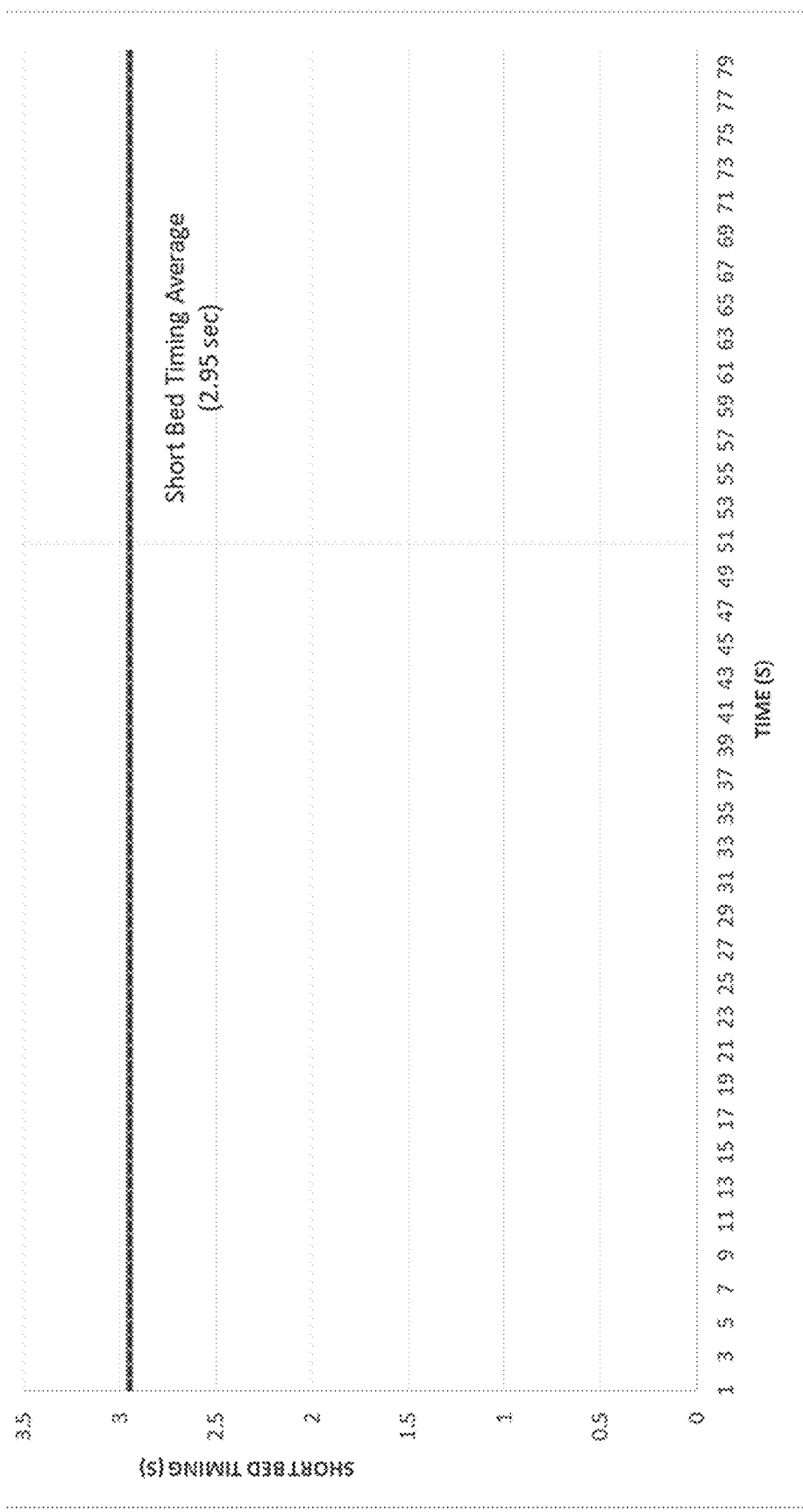
FIG. 16 is a graph showing control output vs time for Run 5 of 5 of the Leak Load Test.

FIG. 12 shows control output of Test Run #1 versus time(s). Variability can be seen in this graph due to the real time compensation of the slide valve timing caused by the flight-simulated variations in demand. This confirms the need for a "long average" to represent the change in bed performance over a number of flights. In order to provide a representation of the result when implemented in software, an average has been taken for each test run with successively increasing demand, as shown in FIG. 12 through FIG. 16.

Figure 17:
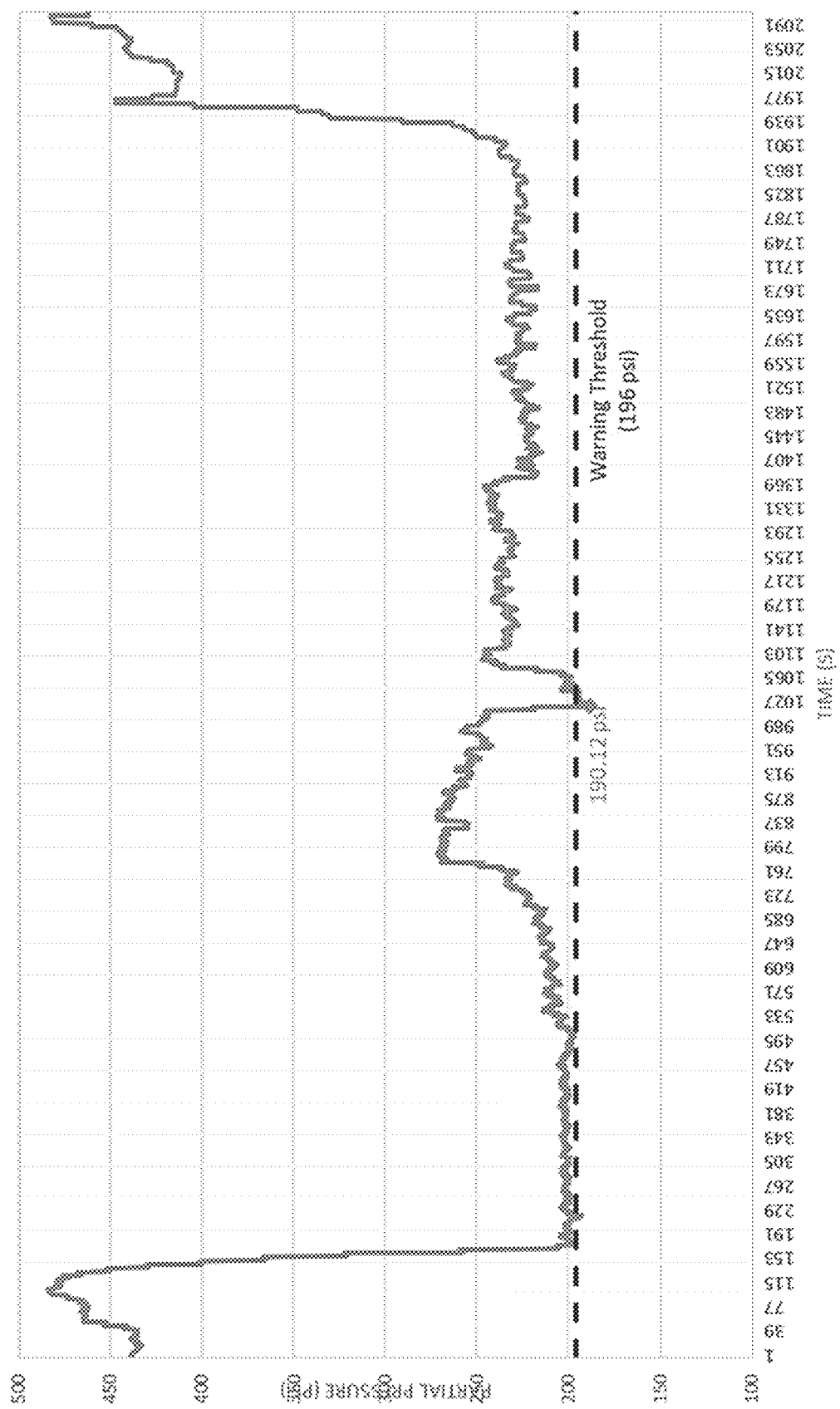
FIG. 17 is a graph showing control output vs time for a Leak Load Test having a leak of 35 lpm under a heavy load of 44 breaths per minute (bpm).

One notable set of results is shown in FIG. 17. This test has a large leak of 35 lpm and breathing machines on high speed at 44 bpm. At this high demand, the partial pressure of $O_2$ in the OCA reaches a value of approximately 190 mmHg. This was very close to triggering the warning threshold at 196 mmHg. This provides additional evidence for the validity of the method. However, the warning light required a persistence state of 26 seconds of partial pressure below 196 mmHg, resulting in no warning light. When the control average reaches a value of 2,800 or 2,850, the concentrator performance has degraded to the point that the risk of experiencing a warning light during flight increases significantly.

FIG. 11 demonstrates that there is a roughly linear correlation between control output value and concentrator health ($O_2$ production capability). Therefore, the control output value can be used to predict the concentrator performance degradation level and also predict when maintenance will be needed to prevent warning lights during flight. As also seen in FIG. 11, during times of "high effort" for the OCA, such as a combination of high demand and degraded sieve (simulated with high leak), the partial pressure of $O_2$ may drop to such an extent that a warning light may be triggered.

CHM monitors health by measuring the control output value to determine the level of degradation in the sieve. This method provides continuous monitoring and offers greater accuracy than the current MBIT function. CHM also includes slide valve degradation monitoring by measuring the time delay between when the slide valve is commanded to shift positions and when the pressure dip is observed.

Although the invention has been described with reference to preferred embodiments thereof, it is understood that various modifications may be made thereto without departing from the full spirit and scope of the invention as defined by the claims which follow. While specific reference has been made to rotational movements of device components, it should be understood by those skilled in the art that such rotations may be reversed and that such teachings are within the scope of the present invention.

What is claimed is:

1. A method of monitoring the health of an oxygen concentrator assembly within an onboard oxygen generating system (OBOGS) operable to produce an oxygen enriched gas, wherein the OBOGS includes a controller, an oxygen generator assembly having a plurality of molecular sieve beds configured to produce the oxygen enriched gas, and a mechanical system configured to selectively communicate inlet air to only a subset of the plurality of molecular sieve beds at a given time, said method comprising:
   a) issuing a command, via the controller, to switch communication of the inlet air from a first subset of the plurality of molecular sieve beds to a second subset of the plurality of molecular sieve beds;
   b) observing, via a pressure sensor located upstream the mechanical system, a dip in pressure upon switching of the inlet air;
   c) calculating a time delay between when the command to switch is issued and when the pressure dip is observed;
   d) correlating the calculated time delay to a measure of mechanical system degradation;
   e) determining whether one or more of the molecular sieve beds or the oxygen concentrator assembly require maintenance based on the measure of mechanical system degradation; and
   f) generating a warning indicating when the one or more of the molecular sieve beds or the oxygen concentrator assembly requires maintenance or replacement.

2. The method in accordance with claim 1 wherein the mechanical system includes a slide valve assembly comprising a slide valve and associated seals, and a pressure sensor located upstream the mechanical system.

3. The method in accordance with claim 1 wherein the mechanical system includes a slide valve assembly comprising a slide valve and associated seals.

4. The method in accordance with claim 3,
   wherein measurement of the mechanical system degradation comprises comparing the calculated time delay of a used slide valve assembly with the calculated time delay of a new slide valve assembly, and
   wherein when the compared calculated time delay exceeds a predetermined value the oxygen concentrator assembly requires replacement.

5. The method in accordance with claim 4 wherein the calculated time delay is averaged with a selected number of previously calculated time delays to produce an average time delay, wherein a slide valve warning is issued when the average time delay exceeds the predetermine value.

6. The method in accordance with claim 1 wherein the method further comprises:
   g) monitoring, via the controller, a short bed cycle time required to produce a desired $O_2$ concentration within the enriched oxygen gas supply, wherein the short bed cycle time is a fraction of a fixed full cycle time;
   h) adjusting, via the controller, the short bed cycle time to thereby maintain production of the desired $O_2$ concentration; and
   i) generating the warning when the short bed cycle time reaches a predetermined fraction of the fixed full cycle time,
   wherein when the calculated time delay of the mechanical system does not exceed a predetermined value, the warning indicates that the plurality of molecular sieve beds require maintenance or replacement.

7. The method in accordance with claim 6 wherein the short bed cycle time is continually averaged over a period of time to produce a moving average wherein the warning is generated when the moving average reaches the predetermined fraction.

8. The method in accordance with claim 1 further comprising monitoring the flow and purity of the oxygen enriched gas downstream of the plurality of molecular sieve beds.

* * * * *